US006389513B1

(12) United States Patent
Closson

(10) Patent No.: US 6,389,513 B1
(45) Date of Patent: *May 14, 2002

(54) DISK BLOCK CACHE MANAGEMENT FOR A DISTRIBUTED SHARED MEMORY COMPUTER SYSTEM

(75) Inventor: Kevin A. Closson, Forest Grove, OR (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,387

(22) Filed: May 13, 1998

(51) Int. Cl.[7] ............................................. G06F 12/00
(52) U.S. Cl. .................. 711/129; 711/121; 711/147; 711/148; 710/104; 709/200; 709/201; 709/105; 707/8; 712/28; 712/29; 712/30; 712/31; 712/34
(58) Field of Search ................................ 711/129, 147, 711/121, 148; 710/104; 707/8; 709/105, 200–201, 195; 712/28–31, 34

(56) References Cited

U.S. PATENT DOCUMENTS

| 5,535,116 A | * | 7/1996 | Gupta et al. ................. 364/134 |
| 5,649,102 A | * | 7/1997 | Yamauchi et al. ........... 709/213 |
| 5,680,573 A | * | 10/1997 | Rubin et al. ................. 711/129 |
| 5,724,501 A | * | 3/1998 | Dewey et al. ................. 714/9 |
| 5,774,643 A | * | 6/1998 | Lubbers et al. ............... 714/20 |
| 5,870,746 A | * | 2/1999 | Knutson et al. ............ 707/101 |
| 5,875,464 A | * | 2/1999 | Kirk ............................ 711/129 |
| 5,887,146 A | * | 3/1999 | Baxter et al. ............... 710/104 |
| 5,940,827 A | * | 8/1999 | Hapner et al. ................. 707/8 |
| 6,049,853 A | * | 4/2000 | Kingsbury et al. ......... 711/147 |
| 6,115,790 A | * | 9/2000 | Schimmel .................... 711/119 |

OTHER PUBLICATIONS

Lovett and Clapp, "STiNG: A CC–NUMA Computer System for the Commercial Marketplace," *ISCA'96*, pp. 308–317 (1996).
Krakovsky, *Understanding the Oracle Server*, chapter 4, pp. 35–48 (1996).
Bach, *The Design of the Unix Operating System*, chapter 3, pp. 38–59 (1986).

* cited by examiner

*Primary Examiner*—Do Hyun Yoo
*Assistant Examiner*—Mehdi Namazi
(74) *Attorney, Agent, or Firm*—Klarquist Sparkman Campbell Leigh and Whinston LLP

(57) ABSTRACT

A buffer cache management structure, or metadata, for a computer system such as a NUMA (non-uniform memory access) machine, wherein physical main memory is distributed and shared among separate memories. The memories reside on separate nodes that are connected by a system interconnect. The buffer cache metadata is partitioned into portions that each include a set of one or more management data structures such as hash queues that keep track of disk blocks cached in the buffer cache. Each set of management data structures is stored entirely within one memory. A first process performs operations on the buffer cache metadata by determining, from an attribute of a data block requested by the process, in which memory a portion of the metadata associated with the data block is stored. The process then determines if the memory containing the metadata portion is local to the process. If so, the first process performs the operation. If not, the first process requests that a second process that is local to the memory perform the operation. The second process then performs the operation and notifies the first process of the operation results.

34 Claims, 8 Drawing Sheets

DISK BLOCK CACHE MANAGEMENT FOR A DISTRIBUTED SHARED MEMORY COMPUTER SYSTEM

FIELD OF THE INVENTION

This invention relates generally to cache management for computer systems. More particularly, this invention relates to management of disk blocks cached in the memory of a distributed shared memory computer system. An example of such a computer system is a NUMA (non-uniform memory access) machine.

BACKGROUND OF THE INVENTION

In a computer system, one of the tasks of the operating system kernel is to maintain files such as data on mass storage devices (such as disks) so that processes executing in the computer can properly access these files. For example, when a process,wants to read data from a file stored on disk, the kernel brings the data into the main memory of the computer where the process+an access it. Similarly, the kernel often writes data in main memory back to disk to save the data.

The kernel could read and write directly to and from the disk for all file system accesses, but system response time and throughput would be poor because disk access times are quite slow. The kernel therefore attempts to minimize the frequency of disk access by keeping a pool of internal data buffers in main memory, called the buffer cache. A typical buffer cache and its management are described in *The Design of the UNIX Operating System*, by Maurice J. Bach (Prentice-Hall 1986), which is incorporated by reference herein and summarized below. Traditional UNIX systems, for example, use a dedicated area in memory called the block buffer cache to cache blocks accessed through the file system; the virtual memory system caches process text and data pages separately. Modern UNIX systems integrate the buffer cache within the virtual memory system.

When reading blocks of data from disk, the kernel attempts to read first from the buffer cache. If the data is already in the cache, the kernel does not have to read from disk. If the data is not in the cache, however, the kernel reads the data from disk and caches it, using an algorithm that tries to save as much good data in the cache as possible. Similarly, the kernel caches data that it writes to disk so that the data is available in memory if the kernel later tries to read it.

During system initialization, the kernel allocates space for a number of buffers, configurable according to memory size and system performance constraints. A buffer consists of two parts: a data array of memory that contains data blocks from disk and a buffer header that identifies a particular data array. Because there is a one-to-one mapping of buffer headers to data arrays, both parts are often referred to in the art as a "buffer." The context of a particular reference should make clear which part is being discussed. The data in a buffer corresponds to the data in a logical disk block in a file, and the kernel identifies a buffer's contents by examining fields in the buffer header. The buffer is the in memory copy of the disk block; the contents of the disk block map into the buffer, but the mapping is temporary and exists only until the kernel decides to map another disk block into that particular buffer.

The buffer header contains a number of fields and pointers that provide information about the buffer and its contents. Several fields uniquely identify the buffer such as by the file system and block number of the data on disk. Another field gives the status of the buffer such as locked, valid, etc. A pointer points to the associated memory array that stores the data. The buffer header also contains two sets of pointers used by buffer allocation algorithms to maintain the overall structure of the buffer pool.

One of these sets of pointers relates to a free list of buffers maintained by the kernel. Data is cached in the buffer pool according to a least recently used algorithm. After the kernel allocates a buffer to a disk block, it cannot use the buffer for another block until all other buffers have been used more recently. The free list preserves the least recently used order. The free list is typically implemented as a circular, doubly linked list of buffer headers with a dummy buffer header that marks its beginning and end; the forward and backward pointers in the header link the buffer to the list. Every buffer is put on the free list when the system is booted. The kernel normally removes a buffer from the head of the free list when it needs to allocate a buffer for a disk block and places a buffer at the tail of the free list when the buffer is available for allocation. Hence, the buffers that are closer to the head of the free list have not been used as recently as those that are further from the head.

The other set of pointers is used for efficient searching of the buffer pool for a particular buffer. Rather than simply group all of the buffers into the buffer pool, the kernel organizes the buffers into separate queues, hashed as a function of a disk block attribute such as its address (e.g., file and block offset). The kernel links the buffers on a hash queue into a circular, doubly linked list using the forward and backward pointers in the set. A hashing function is chosen that uniformly distributes the buffers across the set of hash queues, such as a modulo function.

FIG. 1 shows a cache management data structure (also known as buffer cache metadata) that includes headers of the hash queues on the left side and associated rows of buffer headers for each hash queue on the right side. The queue headers are also known as "buckets" and the queues as "chains" or "lists" of buffer header elements. With a hashing function of modulo 4, all buffers whose disk block numbers are multiple of 4 are elements of the first hash queue, buffers whose disk block numbers have a remainder of 1 are elements of the second hash queue, etc. FIG. 1 also shows how the free list is implemented through the doubly linked list. Buffer 3 is at the head of the free list and buffer 10 is at the tail.

In a traditional implementation each buffer in the buffer cache exists on a hash queue. A buffer may also be on the free list if its status is free. Because a buffer may be simultaneously on a hash queue and on the free list, the kernel has two ways to find it. It searches the hash queue if it is looking for a particular buffer, and it removes a buffer from the free list if it needs a buffer for storing a disk block.

Although buffer caches were initially used in operating systems, they are not limited to such. They also find use in application programs including database management systems (DBMS) or database servers. These servers manage large databases of information (data) such as product information, employee information, or airline reservations. DBMSs are often configured as a client/server model with a database of information and a database server as the back end and inexpensive desktop computers as front ends, or clients. The client runs user-friendly applications that enable a user to communicate with the database server. User requests to a database server are called queries.

In a database the information is physically stored in several files but is logically organized into tables of related data such as employees, products, etc. A table consists of a set of rows and columns. A column represents a category of data, such as Employee Name, while a row represents specific instances of those categories—for example, all of the data for one employee. A table is a logical area of storage made up of data segments that are allocated by the database server for storing table data. For example, in an employee table, the data segment stores such information as the names of the employees, their hire dates, and so forth. A data segment, in turn, is made up of data blocks. A data block is the smallest logical unit of storage. A data block consists of row data (the actual data contained in rows or parts of rows of a table), free space (space that can be used for adding new rows), and block information (block attribute, applicable table, and other header information). Though a data block is a logical structure, it corresponds to a certain number of bytes of physical disk space. This related physical space is a disk block. The terms data block and disk block are often used interchangeably.

In many cases a database of interest is a massive object occupying thousands of billions of bytes (terabytes) of data, only a small portion of which can be stored in the main memory of the computer system at any time. The permanent copy of the database is stored on secondary storage such as a disk. In response to user queries the database server stores requested disk blocks in a disk block buffer cache. FIG. 2 shows how a disk block buffer cache is used in a particular database server, the Oracle Server from Oracle Corporation of Redwood Shores, California. The database buffer cache shown there is a region of main memory that stores the buffers as well as the buffer cache metadata (e.g., hash queue headers and buffer headers). This particular database server has two lists: an LRU list and a dirty list, which together are equivalent in function to the free list described above. The database writer (DBWR) is a process responsible for writing modified data from buffers in the cache (listed on the dirty list) to data files on disk. If a buffer on the LRU list has modified data, it is not overwritten but is first moved to the dirty list. Once the DBWR copies the modified data on the dirty list to the data files, the buffers on that list are free for use.

This caching of disk blocks, of course, reduces the number of times data must be read from the disk, an operation that is thousands of times slower that reading the data directly from main memory. A disk operation is thus avoided if a disk block required by another query is already stored in the buffer cache. For large computer systems with massive databases, the disk block buffer cache must itself be quite large. It is not uncommon to require a buffer cache of tens of billions of bytes to reduce disk 10 operations sufficiently to meet system performance requirements.

Whether used in an operating system or an application program, disk block buffers are traditionally allocated from a global pool of main memory without concern for system topology. This same allocation is true for the buffer cache metadata that keeps track of each disk block in the buffer cache. This means that the physical memory locations for the buffers in the cache and for the metadata are not necessarily contiguous, but can be anywhere within an area of memory reserved for the buffer cache.

For most computer systems the actual locations of the buffers or cache metadata is not of concern because the memory is centralized. In a uniprocessor machine, for example, there is only one physical location for main memory and all of its storage is equally accessible in time to the processor (that is, all storage has the same latency). This is also true in multiprocessor computers known as symmetric multiprocessors (SMPs), which have a single, centralized physical memory shared by all of the processors.

SMP systems, however, use a single-bus architecture that limits performance as the number of processors in the system grows beyond a certain amount. Because of its nature, a bus cannot physically connect large numbers of processors while still providing both the bandwidth capacity and memory access latency required by today's high-speed microprocessors. Thus the benefit of a disk block buffer cache to a DBMS is no longer fully realized once an SMP system grows to the extent that its bus bandwidth begins to fall.

To overcome the limitations of SMP systems, a new multiprocessor architecture has emerged in recent years. The architecture combines a multiple of SMP nodes with a system interconnect. Each of the nodes has a limited number of processors, local memory, and remote cache interconnected thereon by a high-speed node bus. A single physical memory address space is still shared by all the processors of the computer, but the memory is distributed among the separate nodes. Computers built with this architecture are called distributed shared memory machines and are described in a number of publications such as *Computer Architecture: A Quantitative Approach*, by Hennessy and Patterson (Morgan Kaufmann 1996), which is incorporated herein by reference. These computers are also known as NUMA (non-uniform memory access) machines because access to the separate physical memories by different processors is no longer uniform in time. Processors located on the same node as a local memory access the local memory faster than processors that must access that memory from across the system interconnect.

This difference in memory access times presents a problem in managing a disk block buffer cache on a NUMA machine. Recall that the cache metadata that manages the buffer cache is traditionally allocated from a global pool of main memory without concern for the system topology. Almost certainly, then, this metadata (which is accessed much more often that the buffers themselves) is stored on a number of nodes. A processor on one node, in accessing the metadata to locate, allocate, or deallocate buffers, must therefore reference memory on several remote nodes across the system interconnect. These frequent and long references to remote memories take significant time. Performance tests with NUMA machines have shown that the execution time required for cache management increases dramatically as the number of nodes increases, despite the presence of a remote cache on the processor's node to cache metadata stored in remote memories. The remote cache simply cannot keep up with the frequent changes to the metadata stored in the remote memories, and thus is frequently out of date.

An objective of the invention, therefore, is to provide a method and means for efficiently accessing cache management data in a distributed shared memory computer system such as a NUMA machine.

SUMMARY OF THE INVENTION

In accordance with the invention, a buffer cache management structure for a distributed shared memory computer system comprises a first portion of the management structure stored in the first memory and containing a first set of management data structures for a buffer cache and a second portion of the management structure stored in the second memory and containing a second set of management data structures for a buffer cache. Each set of management data structures is stored entirely within one memory.

Further in accordance with the invention, a process may perform operations on a buffer cache management structure stored in a distributed shared memory computer system through the following actions: determining, from an attribute of a data block requested by a first process, in which memory a buffer cache management structure associated with the data block is stored; determining if the memory containing the buffer cache management structure is local to the first process if the first process is remote from the memory, having a process that is local to the memory perform the operation on the buffer cache management structure. Such a process may be a second process separate from the first process In one embodiment of this method, the first process performs the operation on the buffer cache management structure if the memory is local to the first process.

The foregoing and other features and advantages of the invention will become more apparent from the following detailed description and drawings of an illustrated embodiment.

DETAILED DESCRIPTION OF AN ILLUSTRATED EMBODIMENT

The illustrated embodiment is implemented within a multiprocessor computer having distributed shared memory. It should be recognized, however, that the invention is not limited to this implementation but can be applied wherever buffer cache management involves memories with different access times for processes executing on the computer system.

Figure 1:
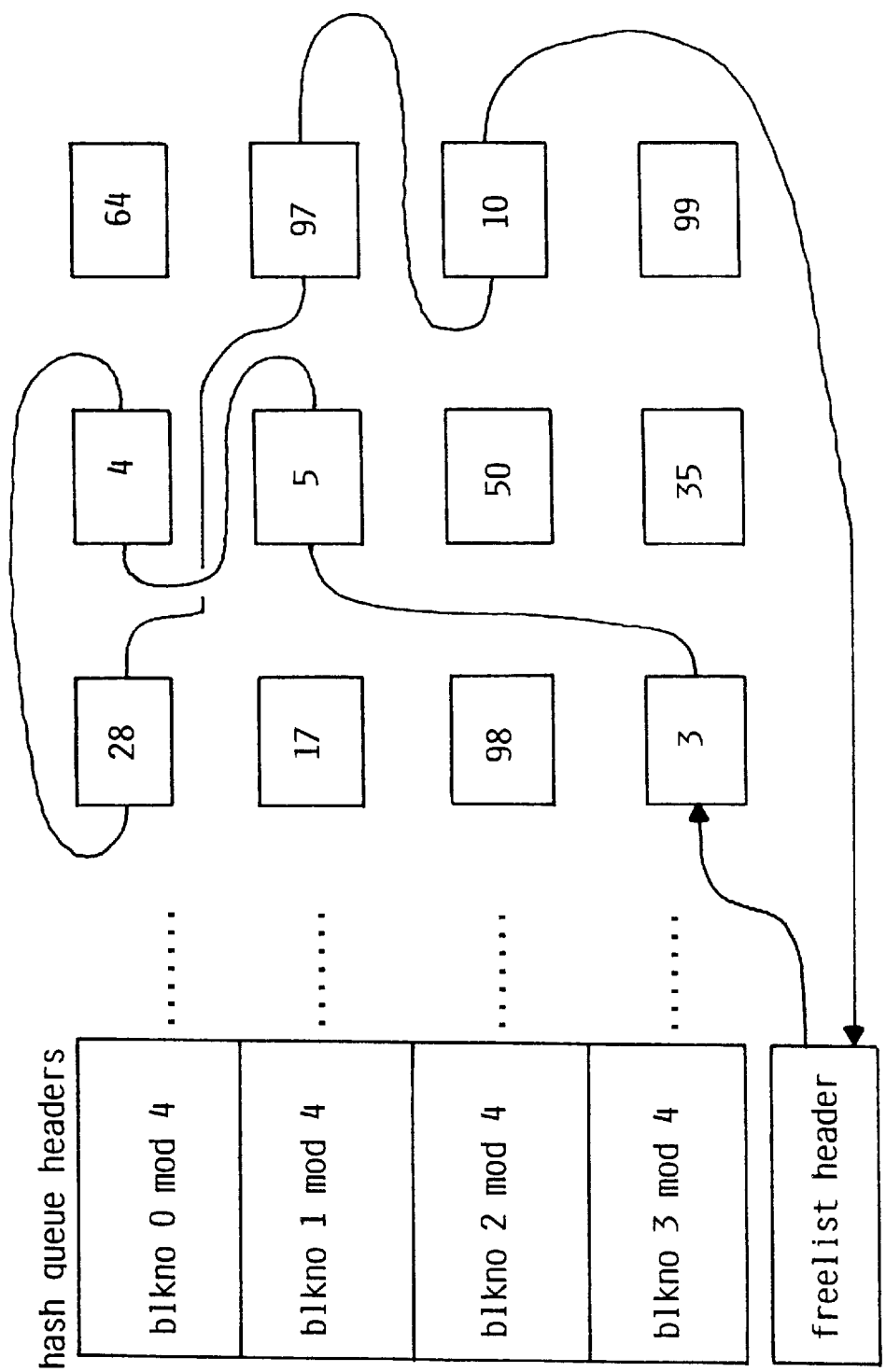
FIG. 1 is a block diagram showing how a buffer cache, including buffers and its metadata, is traditionally organized.
Figure 2:
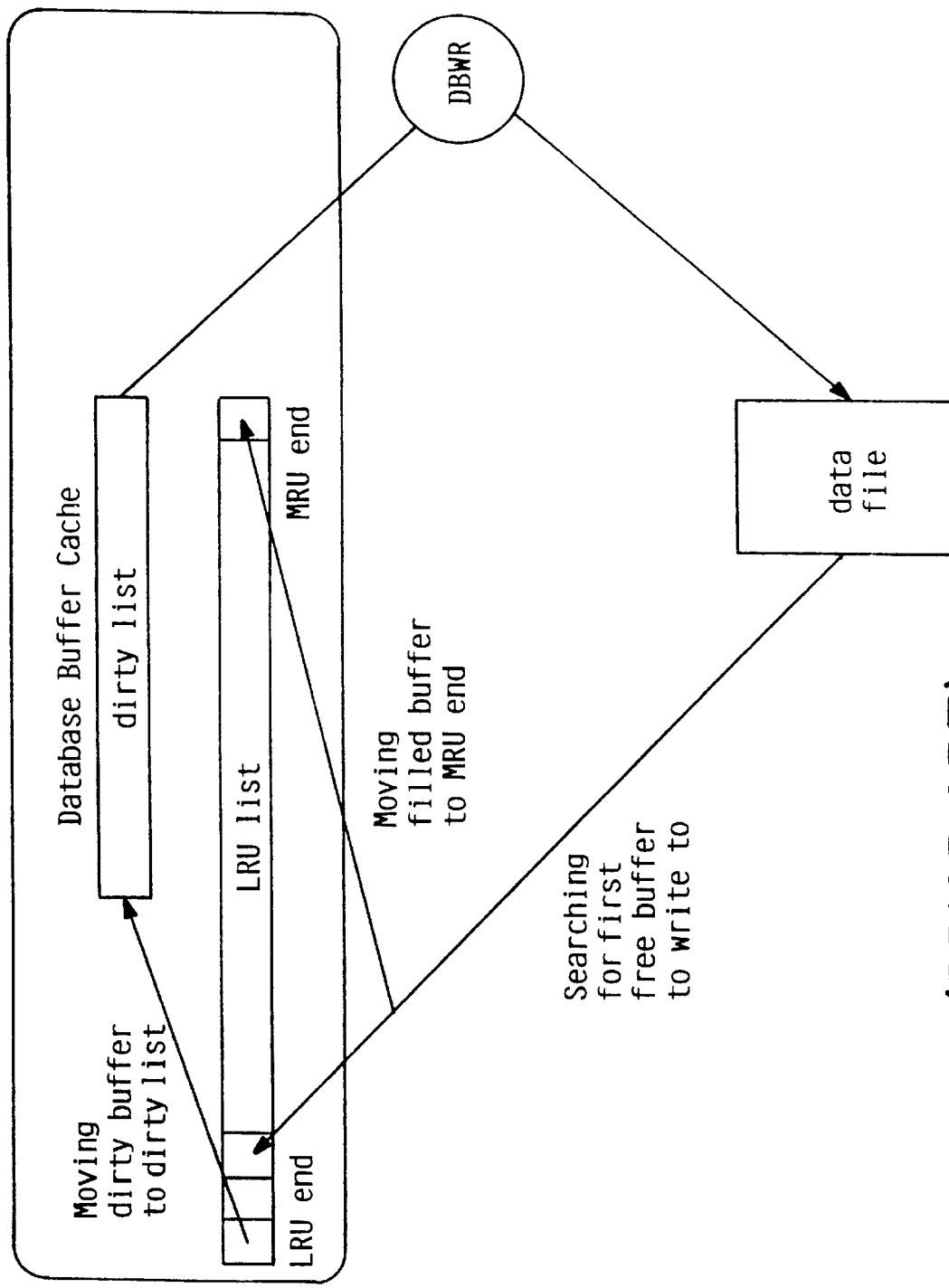
FIG. 2 is a block diagram showing how a buffer cache is organized in a particular database server.
Figure 3:
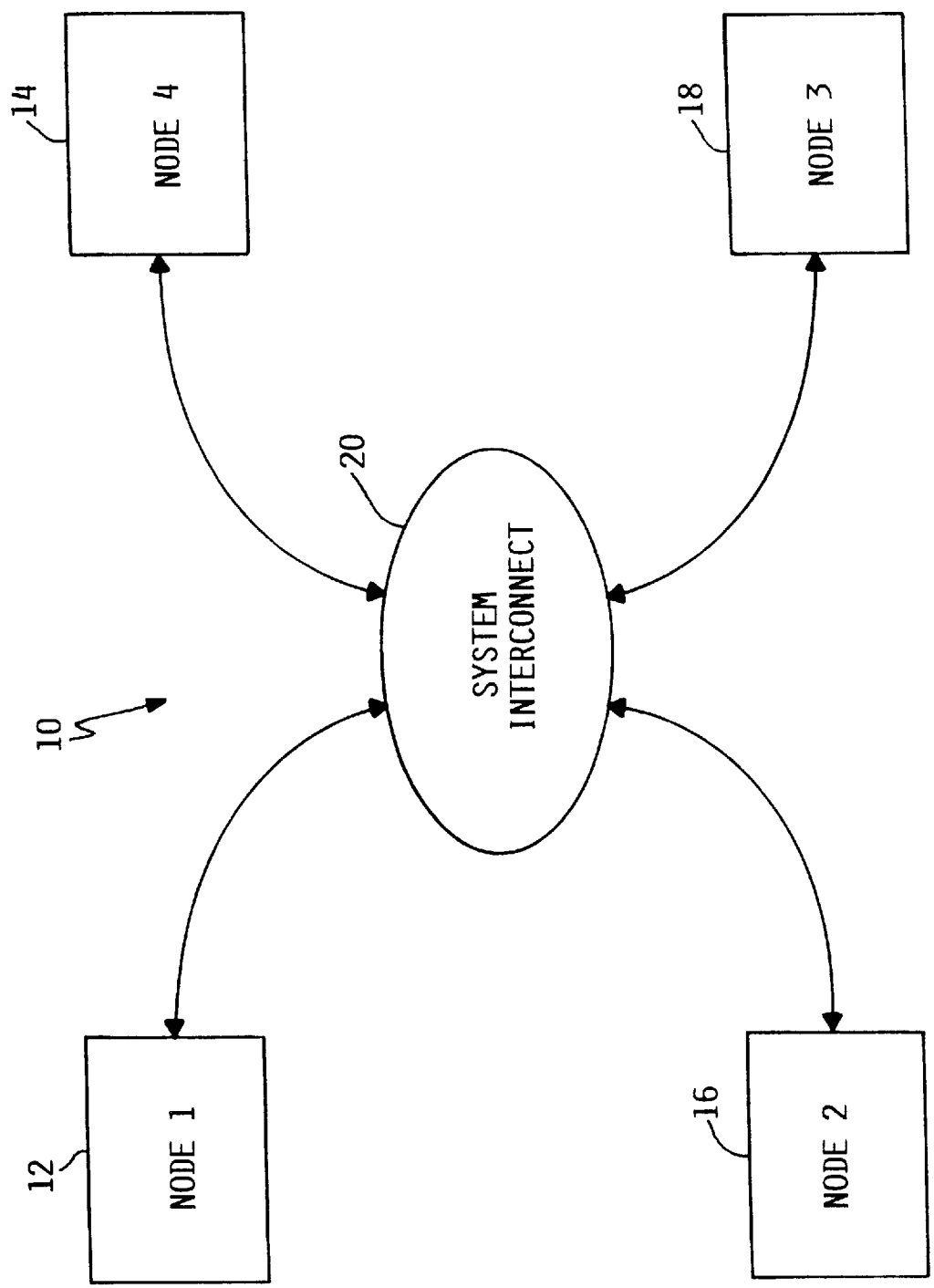
FIG. 3 is a block diagram of a multiprocessor computer system with which the invention may be used.

FIG. 3 is a block diagram of a multinode, multiprocessor computer system 10 that uses a computer architecture based on Distributed-Shared Memory (DSM). This type of computer system is also known as a NUMA machine. Four nodes 12, 14, 16, and 18 are shown connected by a system interconnect 20 (i.e., a network) that permits any node to communicate with any other node. The purpose of system interconnect 20 is to allow processors in any node to access the memory resident in any other node. System interconnect 20 is a switch-based network that uses the Scalable Coherent Interface (SCI) interconnection mechanism. SCI is an IEEE-approved standard that is well documented in a number of publications including *IEEE Std* 1596–1992 (Aug. 2, 1993) and *Multiprocessor Interconnection Using SCI*, a Master Thesis by Ivan Tving, DTH ID-E 579 (1994), both of which are hereby incorporated by reference.

The physical links of interconnect 20 provide high bandwidth and low latency and are scalable to allow for the addition of more nodes.

Links that meet these requirements presently include point-to-point interconnects with a data throughput of one gigabyte/second or greater. The links can be configured in any number of suitable ways for connecting nodes 12, 14, 16, and 18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin—Madison, which is hereby incorporated by reference.

Node Overview

Figure 4:
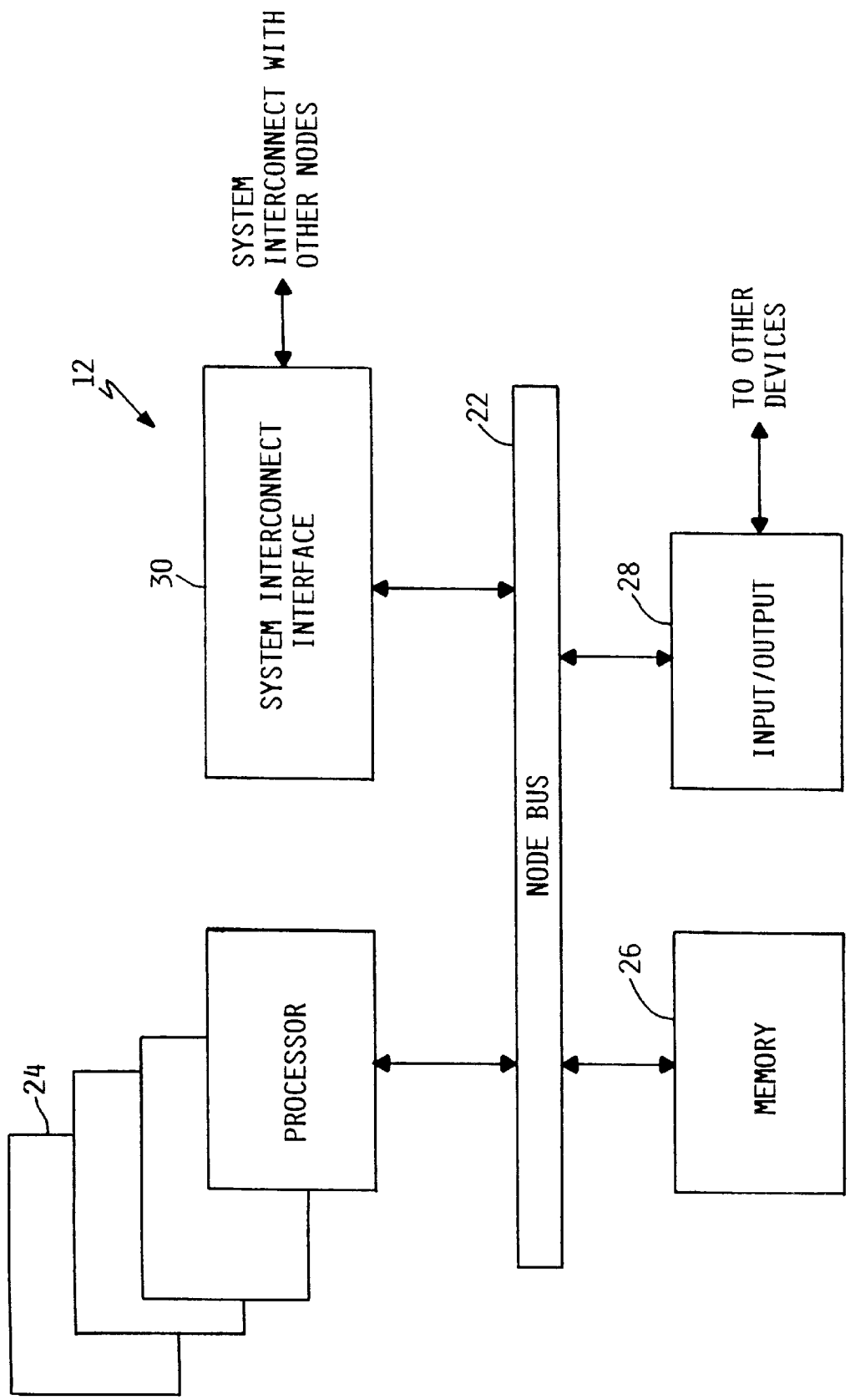
FIG. 4 is a block diagram of a node of the multiprocessor computer system of FIG. 3.

A block diagram of node 12 on system 10 is shown in FIG. 4. The node includes a conventional symmetric multiprocessor (SMP) node bus 22 for connecting multiple data processors 24 to local memory 26. For clarity, nodes 12, 14, 16, and 18 may be referred to as home nodes or remote nodes. A home node is one whose local memory stores a memory block of interest (i.e., the physical address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) device 28, which is also connected to bus 22, connects the node to devices outside computer system 10 for communicating information between the computer system and the outside world. I/O device 28 may be of conventional design and includes means for connecting the node (and hence system 10) to personal computers, local area networks, etc., that wish to utilize the power of the multinode computer system. The 110 device 28 may also allow for connection to peripheral devices, such as floppy disks, hard disks, CD-ROMs etc. To connect node 12 to the other nodes in the system, the node includes a system interconnect interface 30. The system interconnect interface forms part of interconnect 20 along with the physical links between nodes and the same devices on the other nodes of the computer system 10. In the present embodiment, interface 30 is constructed to implement the SCI standard for data communication between the nodes, allowing a processor on one node to transparently access memory physically located on another node. The interface 30 also contains a remote cache in the present embodiment, although the remote cache could also be separate from the system interconnect interface.

System Initialization

When computer system 10 first starts up or is reset, software executing on the system in accordance with the invention constructs a buffer cache. This software can be incorporated into either system or application hardware or software using a process, thread, kernel thread, lightweight process, thread of kernel execution, etc. These terms and their equivalents are referred to herein as a "process," which includes any coherent sequence of steps undertaken by a computer program. System initialization and other aspects of the invention can be performed by any desired piece of software such as a database server, external cache manager, or an operating system buffer cache.

Figure 5:
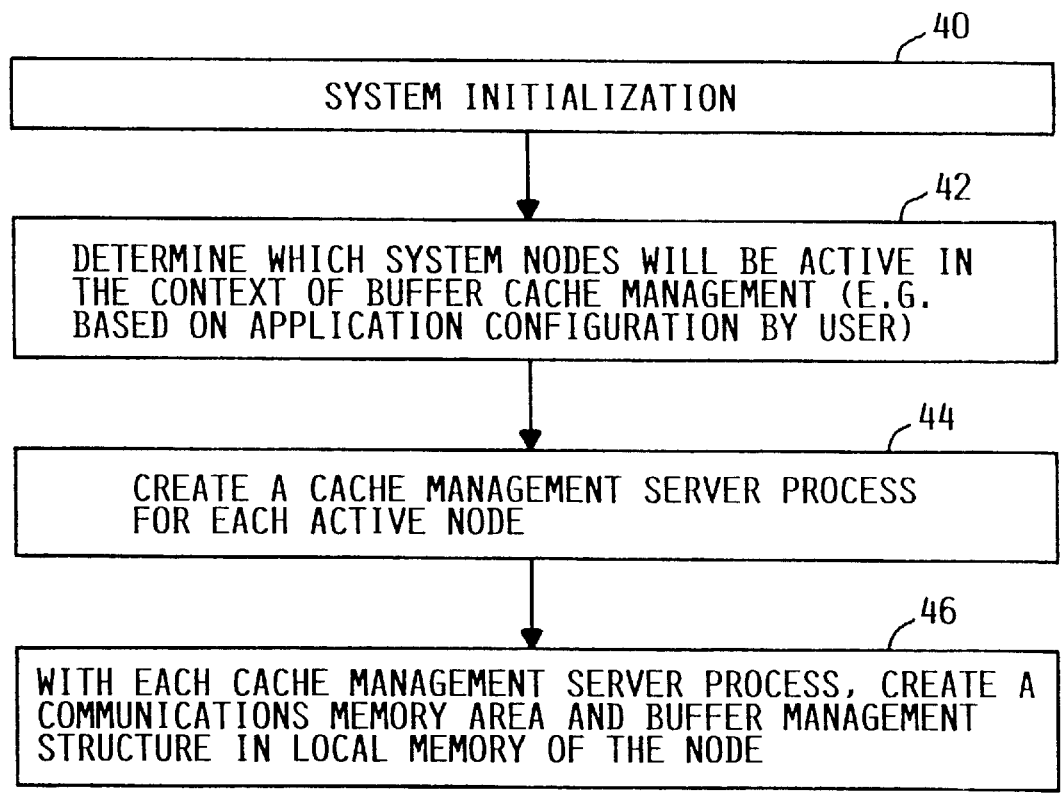
FIG. 5 is a flowchart of a method for constructing a buffer cache management structure in accordance with the invention.

FIG. 5 is a flowchart of a method according to the invention for constructing a buffer cache and its management structure. As part of system initialization 40 in the illustrated embodiment, a master boot process is executed. The master process determines which nodes of system 10 will be active in the context of buffer cache management based on the application configuration of the user (step 42). The master process then uses means such as an operating system API (application programming interface) to create a dedicated cache management server process on each active node (step 44). Equivalent means for creating such server processes could, of course, be used. Each cache management server process creates a communications memory area and a buffer cache management structure on its local memory of the node (step 46). The buffer cache management structure initially includes a free list on which all of the newly created buffer headers are contained and headers for each of the management data structures such as queues. The communications area is where remote processes write requests for management operations to be performed on their behalf by the resident server process, as will be described. The communications area, however, does not absolutely have to be local to either the requesting process or the server process; this is simply a preferred location.

The Buffer Cache Management Structure

Figure 7:
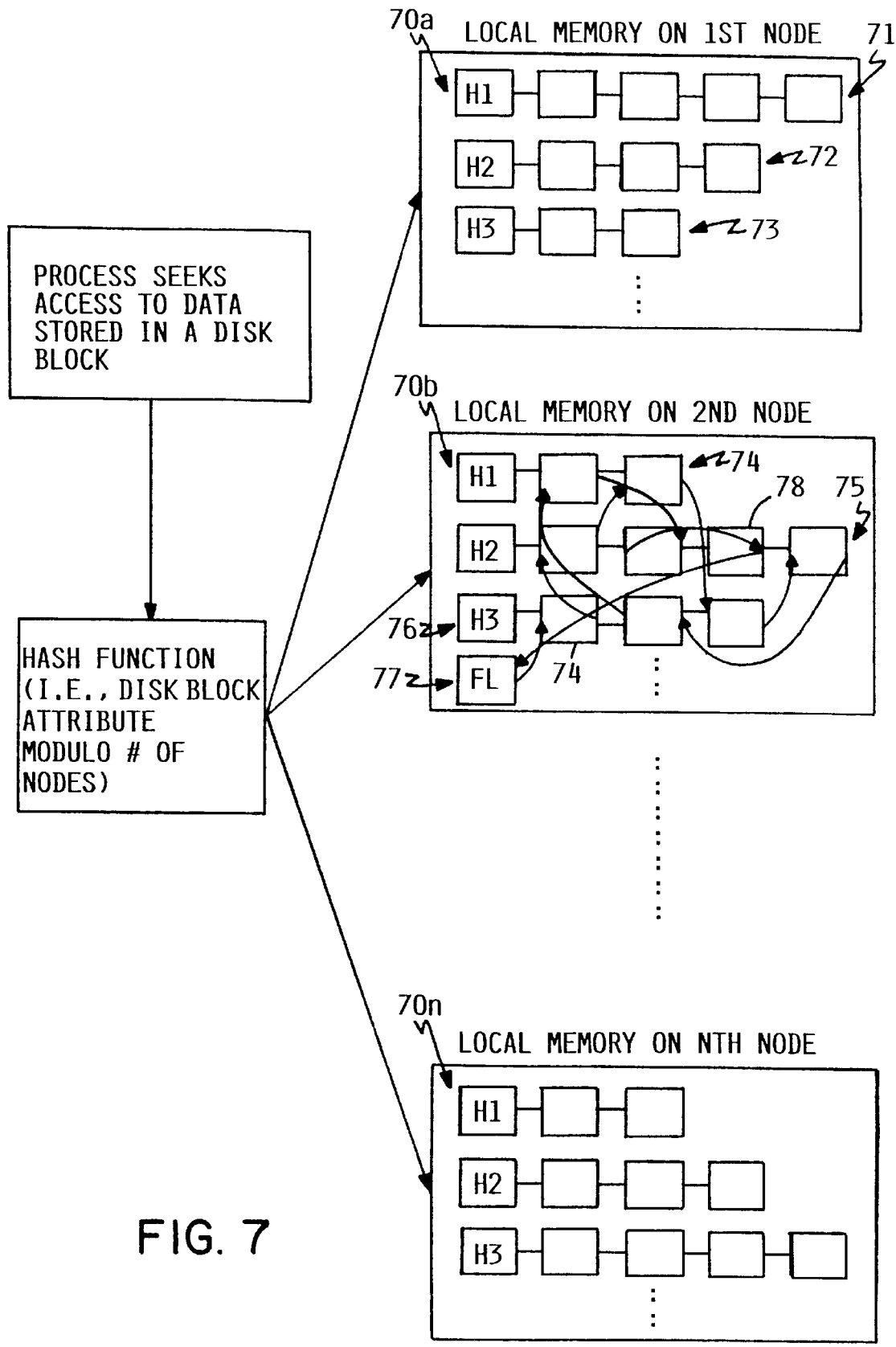
FIG. 7 is a block diagram showing the partitioning of a buffer cache management structure into separate portions for storage in a distributed shared memory computer system.

The buffer cache management structure (also referred to herein as the buffer cache metadata) is a data structure that includes in the illustrated embodiment a set of one or more management data structures such as (but not limited to) hash queues of buffer headers and a free list of buffer headers. For example, FIG. 7 shows stored in each local memory portions of buffer cache metadata 70a, 70b, 70n. Within buffer cache metadata 70a is shown management data structures 71, 72, 73 (the links between elements of the management data structures and other management data structures such as a free list being omitted from the figure for clarity). Similarly, within buffer cache metadata 70b is shown management data structures 74, 75, 76, and 77 (free list).

Recall that initially the hash queues are empty and all of the buffer headers are contained on the free list. As a process seeks access to data stored in a disk block that is not cached, the buffer header at the top of the free list (the least recently used) is assigned to the disk block and placed on the appropriate queue. The buffer header is also moved to the end of the free list (the most recently used). In this way buffer headers become linked elements of the hash queues.

Figure 6:
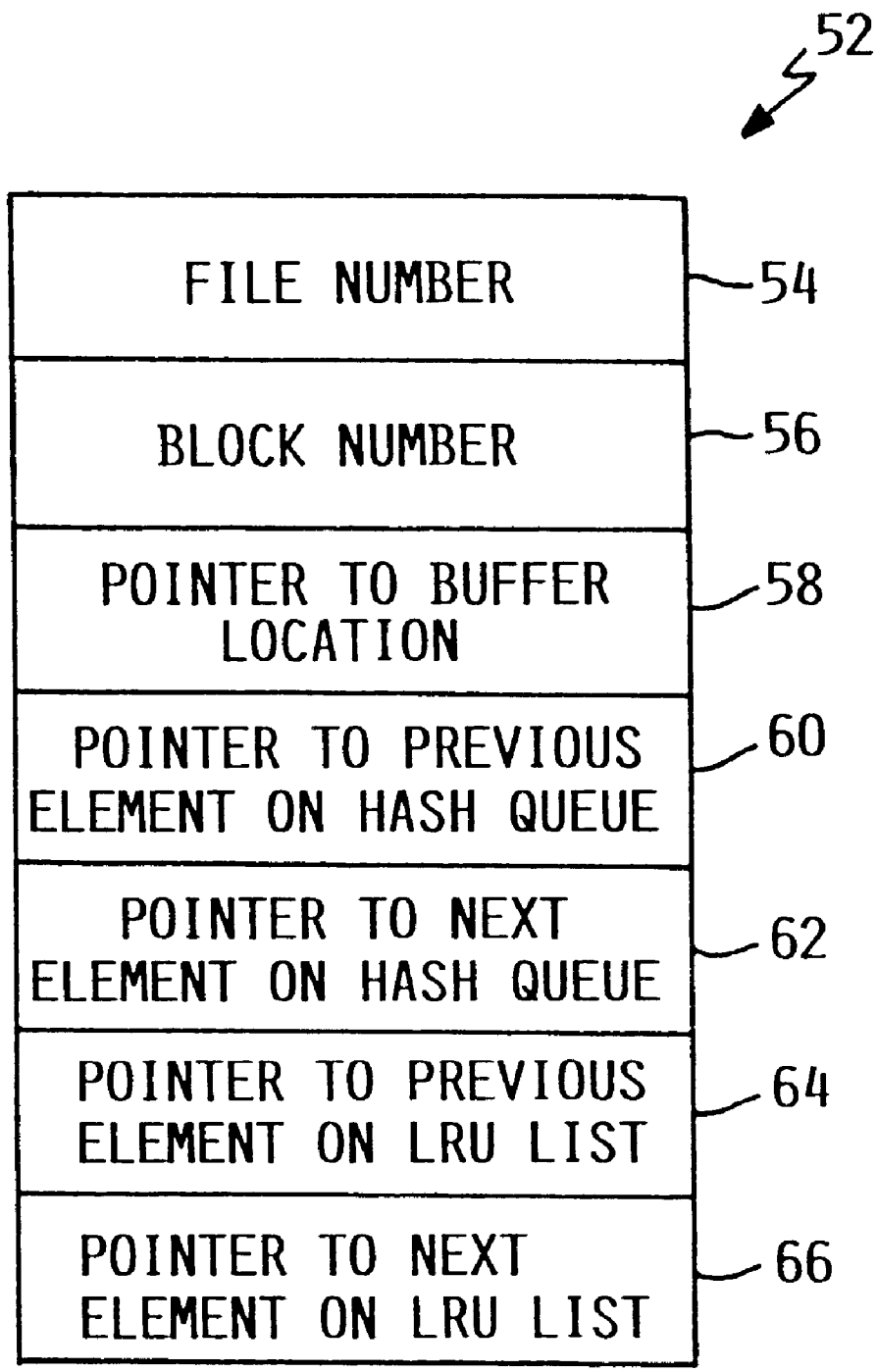
FIG. 6 is a block diagram of an exemplary buffer header for use in the buffer cache management structure of FIG. 5.

FIG. 6 shows the makeup of a buffer header 52, which in this embodiment is an element in a doubly linked list headed by a hash queue header. The element 52 includes fields 54 and 56 for identifying the disk block stored in the associated buffer, a pointer 58 to the memory location of the buffer storing the disk block, and forward and backward pointers 60, 62 to other elements (if any) on the list. The element also includes forward and backward pointers 64, 66 to other elements on a free list of blocks from which additional blocks are taken.

In the illustrated embodiment a buffer header is added as an element to a particular management data structure based on the results of a hashing function on an attribute of the disk block such as its address. In buffer cache metadata 70a, for example, each management data structure is a queue headed by a hash queue header such as H1 or H2 and containing a number of linked buffer header elements indicated by following squares. If hashing on the disk block attribute results in a "1," then H1's list is traversed and each element is examined to determine if an element of the queue refers to the block. If not, then an element is added to H1's list from the free list and configured to refer to the block. A typical hashing function is the modulo operation, although other operations can of course be used.

Localizing the Management Data Structures

Recall that the problem with using prior buffer cache management structures with distributed shared memory systems is the delay inherent in traversing a hash queue that is likely stored on multiple different physical memories. One aspect of the invention avoids that delay by requiring that each management data structure (e.g., a hash queue and its associated hash queue header) be stored entirely within one memory.

FIG. 7 shows how the buffer cache management structure in the illustrated embodiment is partitioned to localize hash queues. Within a local memory each set of hash queues is stored entirely within one memory. For example, the local memory on the first node contains a set of hash queues 71, 72, 73. By design, all elements added to these hash queues will be stored in the first node's local memory. Thus a process traversing the hash queue 71 needs only access one memory. The process does not have to access other memories on the second, third or nth nodes of the system 10 to find elements of the queue 71.

The buffer cache management structure in each memory also includes a free list containing only buffer header elements from a set of management data structures stored entirely within that memory. This feature is shown by example in the local memory for the second node. The arrows indicate a linked LRU list, with the element 79 nearest header FL being the head (and thus least recently used) element and element 78 being the tail. If a process cannot find a data block after traversing the management data structure in which the data block would be referenced if stored in the buffer cache, the process then accesses the free list that is stored in the same local memory as the traversed management data structure. From the free list the process obtains a buffer for storing the data block. For example, if a process has searched data structure 75 for a certain data block in vain, it then accesses free list 77 and takes element 79 as a buffer for the missing data block. Element 79 is then moved from data structure 76 to data structure 75 and is also moved to the tail of free list 77 as the now most recently used buffer header.

The number of management data structures stored per memory can vary and the total number of management data structures within the buffer cache can vary by design. As shown in FIG. 7, however, it is generally preferred to have substantially the same number of management data structures stored in each memory.

Performing Operations on the Buffer Cache Management Structure

Typical operations by a process seeking access to a disk block include disk block look up in the buffer cache, adding and removing disk blocks from the buffer cache, and acquiring a free buffer in the cache for storage of another disk block. A process performs these operations through interactions with the buffer cache management structure.

Figure 8:
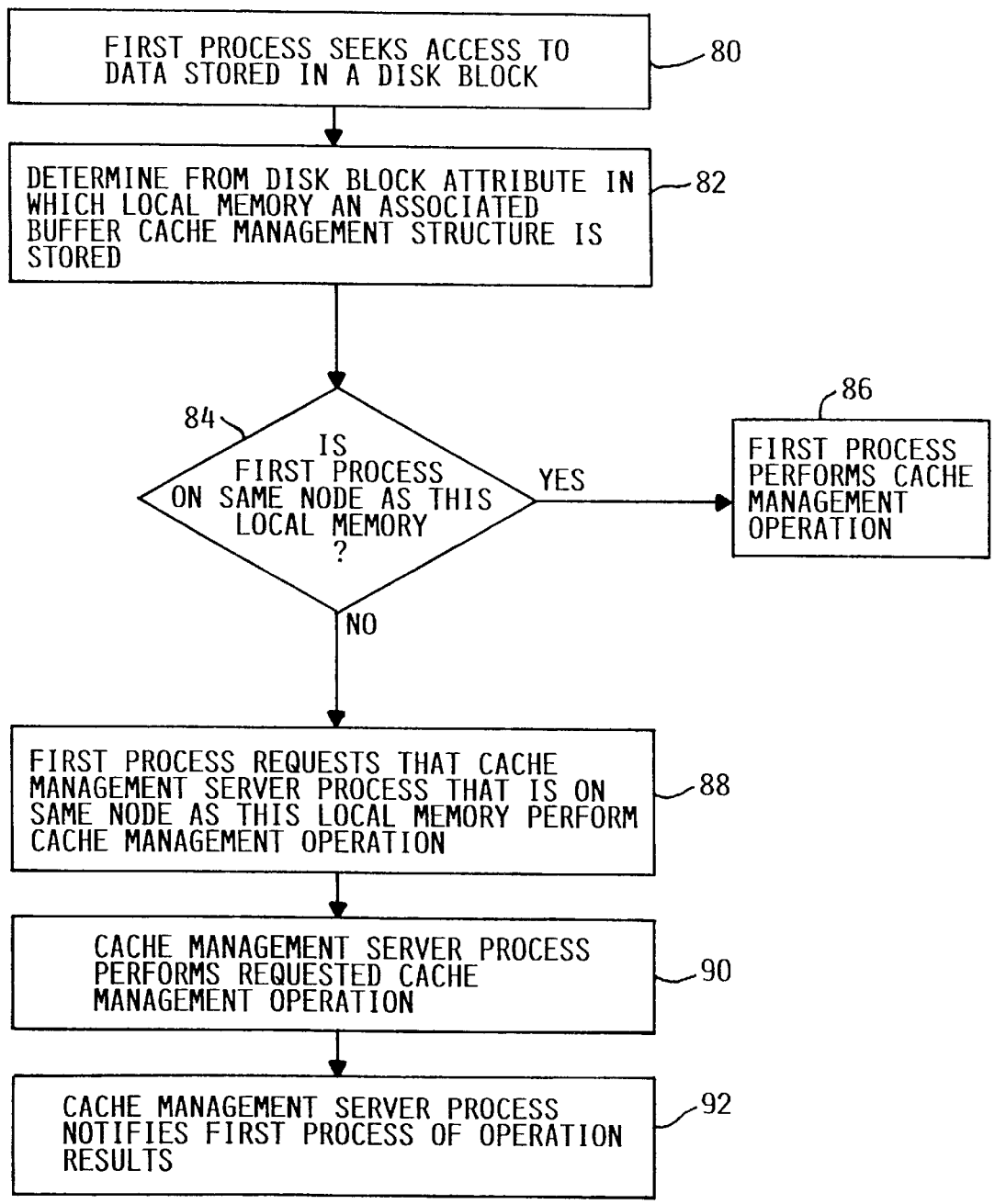
FIG. 8 is a flowchart of a method for accessing a buffer cache management structure in accordance with the invention.

FIGS. 7 and 8 illustrate how a process in the illustrated embodiment performs these operations in accordance with the invention. Assume a first process seeks access to data stored in a disk block (step 80). The attribute of the disk block is examined to determine on which local memory an associated buffer cache management structure is stored (step 82). In the illustrated embodiment, the determination is made with a hash function such as the disk block attribute modulo the number of nodes, although other functions may be used. It is then determined if the memory containing this portion of the buffer cache management structure is local to the first process; that is, is the first process on the same node as this memory (step 84). If the first process and the memory are on the same node, then the first process, in a form of "self service," performs the cache management operation (step 86). If not, the first process requests that the cache management server process that is on the same node as this local memory perform the operation (step 88). The server process then performs the cache management operation (step 90) and notifies the first (requesting) process of the operation results (step 92).

This, of course, is only one embodiment of a method for performing operations on the buffer cache management structure in accordance with the invention. It is possible to vary the number and nature of the steps. For example, the first process may be designed not to perform cache management even on its own node, but rather to request that the server process on its node perform the operation. The first process may migrate to the remote node to perform the cache management operation itself rather than use the services of the server process on that node. The server process may be alerted to perform the operation in any number of ways. The extent, if any, to which the first process is notified of the results may be varied.

Prior to these operations, of course, the disk block attribute is again hashed to find on which hash queue the element for the disk block, if it exists, may be found. For example, assume that there are eight nodes numbered zero to seven in computer system 10 and that the attribute of the disk block sought by a process is a multiple of eight. This disk block attribute hashes to the first node shown in FIG. 7 (which has a $0^{th}$ number). The disk block attribute is then hashed again by, say, a modulo 5 operation. This operation will distribute the disk blocks across five queues in the first node. Similar hashing functions can be applied in the other nodes.

Examples of operations by the process performed on the buffer cache management structure include the following: checking the buffer cache management structure for the presence of the data block in the buffer cache; modifying the buffer cache management structure to reflect the removal or addition of a data block to the buffer cache; and allocating a buffer for a data block from a list of free buffers contained in the buffer cache management structure.

Having illustrated and described the principles of the invention in an exemplary embodiment, it should be apparent to those skilled in the art that the embodiment can be modified in arrangement and detail without departing from such principles. For example, the management data structure can be implemented as a queue, list, bitmap, binary tree or any other data structure capable of performing the described functions. The invention can be used with secondary storage other than disks, and the term "disk block" as used herein is intended to include any type of secondary storage block. Many of the software aspects of the embodiment may be implemented in hardware and many of the hardware aspects may be implemented in software. The invention may be used with other computer systems and with memories such as ROM, DRAM, SRAM, etc. In view of the many possible embodiments to which the principles of the invention may be applied, it should be understood that the illustrated embodiment is intended to teach these principles and is not intended to be a limitation on the scope of the invention. The invention, rather, is limited only by the scope of the following claims. I therefore claim as my invention all that comes within the scope and spirit of these claims and their equivalents.

I claim:

1. A method for a process to perform operations on buffer cache metadata stored in a distributed shared memory computer system having at least two memories, the method comprising:
    determining, from attributes of a data block requested by a first process, in which memory buffer cache metadata associated with the data block is stored;
    determining if the memory containing the buffer cache metadata is local to the first process;
    if the first process is remote from the memory, requesting through the first process that a second process that is local to the memory perform the operation on the buffer cache metadata;
    performing the operation with the second process; and
    notifying the first process of the operation results.

2. The method of claim 1 including:
    if the memory is local to the first process, having the first process perform the operation on the buffer cache metadata.

3. The method of claim 1 including:
    if the memory is local to the first process, having a server process local to the memory perform the operation on the buffer cache metadata.

4. The method of claim 1 wherein the first process is remote from the memory, having a second process that is local to the memory perform the operation on the buffer cache metadata.

5. The method of claim 1 wherein if the first process is remote from the memory, migrating the first process to the memory to perform the operation on the buffer cache metadata.

6. The method of claim 1 wherein the first determining step comprises hashing on the data block attribute to determine in which memory the associated buffer cache metadata is stored.

7. The method of claim 1 wherein the operation is checking the buffer cache metadata for the presence of the data block in the buffer cache.

8. The method of claim 1 wherein the operation is modifying the buffer cache metadata to reflect the removal or addition of a data block to the buffer cache.

9. The method of claim 1 wherein the operation is allocating a buffer for a data block from a free list of buffers contained in the buffer cache metadata .

10. The method of claim 1 wherein the computer system is a non-uniform memory access (NUMA) machine having a multiple of nodes each with a local memory and one or more processors executing processes.

11. The method of claim 1 wherein the buffer cache metadata is partitioned into portions stored in the two memories.

12. The method of claim 1 wherein the buffer cache metadata contains a set of management data structures stored entirely within one memory.

13. The method of claim 12 wherein performing an operation on the buffer cache metadata includes:
    determining from the data block attribute which management data structure in the set the operation is to performed on; and
    performing an operation on the determined management data structure.

14. The method of claim 1 wherein the buffer cache metadata and an associated buffer cache are parts of a database server executing on the computer system.

15. The method of claim 1 wherein the buffer cache metadata is constructed by a database server executing on the computer system.

16. The method of claim 1 wherein the buffer cache metadata is constructed by an external cache manager executing on the computer systems.

17. The method of claim 1 wherein the buffer cache metadata is constructed by an operating system buffer cache executing on the computer system.

18. The method of claim 9 wherein the free list contains only elements from a act of management data structures stored entirely within one memory.

19. The method of claim 12 wherein the management data structures identify blocks cached in buffer caches.

20. The method of claim 1 wherein Se distributed shared memory computer system has a shared physical address space.

21. The method of claim 12 wherein each management data structure comprises a hash queue and associated hash queue header.

22. The method of claim 12 wherein each management data structure comprises a collection of associated buffer header elements.

23. A method for a process to perform operations on a buffer cache metadata stored in a distributed shared memory computer system having at least two memories, the method comprising:

provided buffer cache metadata that is partitioned into portions stored in at least the two memories, each portion containing a set of management data structures stored entirely within one memory;

determining, from an attribute of a data block requested by a first process, in which memory a portion of a buffer cache metadata associated with the data block is stored;

determining if the memory containing the buffer cache metadata is local to the first process;

if the memory is local to the first process, having the first process perform the operation on the buffer cache metadata;

if the first process is remote from the memory, requesting through the first process that a second process that is local to the memory perform the operation on the buffer cache metadata;

performing the operation with the second process; and notifying the first process of the operation results.

24. The method of Him 23 wherein a number of management data structures in a set is substantially the same for each portion of the metadata stored in a memory.

25. The method of claim 23 wherein the computer system is a non-uniform memory access NUMA) system having separate nodes each with a local memory.

26. The method of claim 25 wherein the number of management data structure in a set is substantially the same for each portion of the metadata stored in a local memory.

27. The method of claim 23 wherein the buffer cache metadata and an associated buffer cache am parts of a database Server executing on the computer system.

28. The method of claim 23 wherein the distributed shared memory computer system has a shared physical address space.

29. The method of claim 23 including storing a free list in a memory, the free list containing only elements from a set of management data structures stored entirely within the memory.

30. The method of claim 23 wherein the buffer cache metadata is constructed by a database server executing on the computer system.

31. The method of claim 23 wherein the buffer cache metadata is constructed by an external cache manager executing on the computer system.

32. The method of claim 23 wherein the buffer cache metadata is constructed by an operating system buffer cache executing on the computer system.

33. The method of claim 23 wherein each management data structure comprises a hash queue and associated hash queue header.

34. The method of claim 23 wherein each manageuent data structure comprises a collection of associated buffer header elements.

* * * * *